United States Patent [19]
Riester

[11] 3,816,870
[45] June 18, 1974

[54] WINDSHIELD WIPER BLADE

[75] Inventor: William C. Riester, Williamsville, N.Y.

[73] Assignee: Trico Products Corporation, Buffalo, N.Y.

[22] Filed: Apr. 13, 1972

[21] Appl. No.: 243,613

[52] U.S. Cl. ............................................. 15/250.42
[51] Int. Cl. .............................................. B60s 1/04
[58] Field of Search....... 15/250.32, 250.35, 250.36, 15/250.42

[56] References Cited
UNITED STATES PATENTS
| | | | |
|---|---|---|---|
| 3,131,414 | 5/1964 | Wise | 15/250.42 |
| 3,176,337 | 4/1965 | Glynn | 15/250.42 |
| 3,408,680 | 11/1968 | Heller | 15/250.42 |

*Primary Examiner*—Peter Feldman
*Attorney, Agent, or Firm*—E. Herbert Liss

[57] ABSTRACT

A unitized superstructure for a wiper blade comprises an integrally formed articulated structure consisting of a central primary span and a pair of secondary spans connected at each end of the primary span. The primary span is channel-shaped in cross section and includes planar extensions at its ends which connect the secondary spans at their centers to the primary span. Adjacent each end of the primary span are a pair of depending tabs which embrace a portion of the secondary spans. The superstructure is formed with the longitudinal axes of the secondary spans substantially perpendicular to the longitudinal axis of the primary span. The secondary spans while still pliable are rotated approximately ninety degrees into an operative angular relationship with the primary span and retained in that position by engagement of cooperating latch elements on adjacent spans. The planar end extensions on the primary span form flexible elastic connectors. A squeegee assembly comprises an elastomeric strip supported by a backing strip having a pair of longitudinal rails. At each end of the secondary yoke is a pair of opposed claws which slidably receive the backing strip.

9 Claims, 7 Drawing Figures

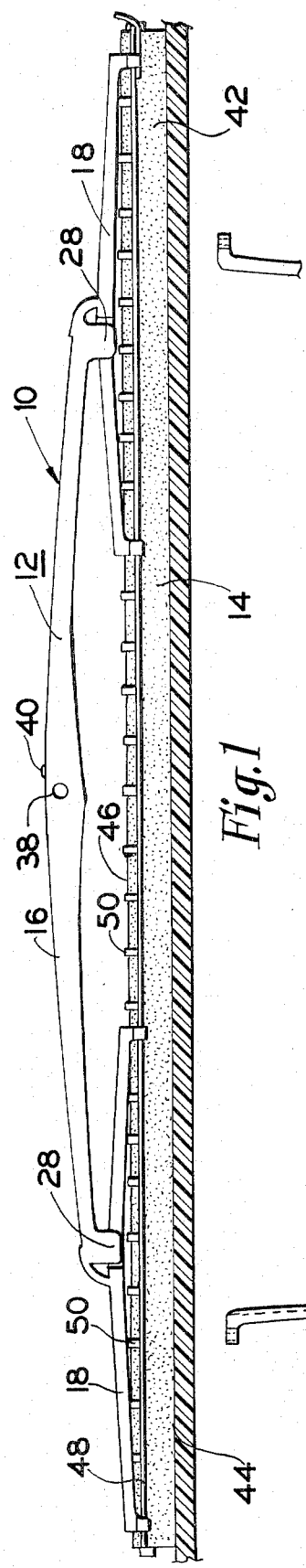
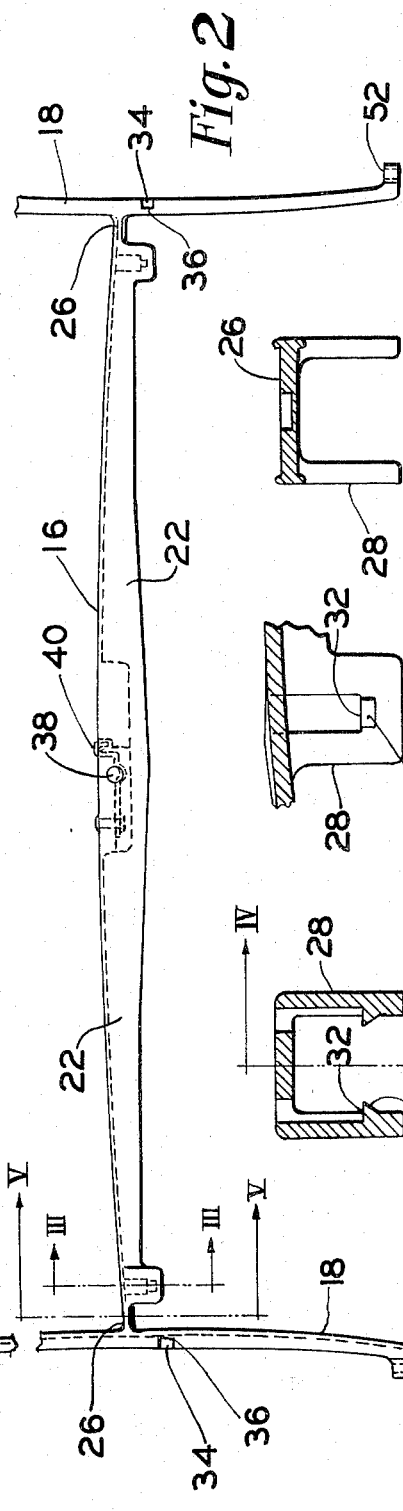
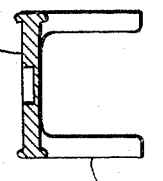
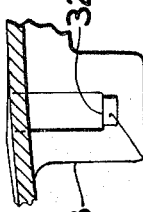
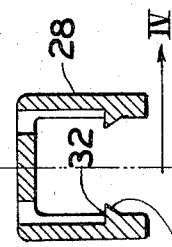
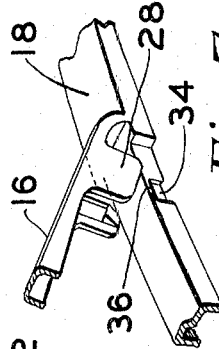
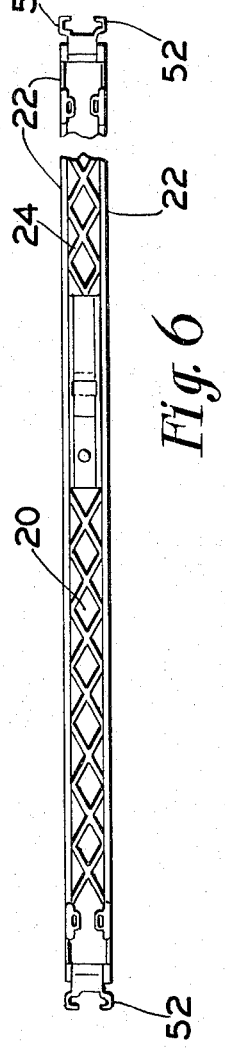

WINDSHIELD WIPER BLADE

BACKGROUND OF THE INVENTION

The invention relates to articulated windshield wiper blades and a method of manufacturing such wiper blades and more particularly to articulated wiper blades having integrally molded superstructures.

Wiper blades for curved windshields generally include an articulated superstructure of separate lever members or spans pivoted together in such a manner as to permit the squeegee element to conform to the curvature of the windshield and to distribute the pressure applied at the center of the superstructure equally along the length of the blade. Certain economies in manufacture can be effected by making the superstructure of one piece construction and particularly of one piece molded thermoplastic construction. The plastic construction, while being economical, also is advantageous in that corrosion problems are avoided and quiet operation is more easily achieved than with metal blades.

Presently known articulated type molded plastic wiper blade superstructures introduce manufacturing difficulties. The arrangement of the levers or spans required in articulated superstructures limits the selection of shapes that can feasibly be molded in a one piece integral or unitized construction. For effective wiping careful design of the configuration of each lever or span is essential because the wiper blade is subjected to torsional forces and twisting as it traverses its arcuate path and is reversed at each end thereof. Substantial lateral rigidity is required to resist twisting and torsional forces. Twisting and deformation produce chattering of the blade and resultant unsatisfactory wiping. Furthermore, because of the relatively fixed or set position of the connection between the levers in the conventional type of molded plastic blade superstructure uniform distribution of the wiper arm loading is not obtainable. Thus the wiper does not conform precisely to the curvature of the windshield. This causes missed areas and smears on the windshield.

SUMMARY OF THE INVENTION

Because of its unique construction the wiper blade of this invention may be formed of molded plastic while minimizing the above-mentioned disadvantages and achieving certain other advantages. Flexibility in the design of the levers is possible. The superstructure of the present invention may include a primary span, channel-shaped in cross section, with integral cross bracing which results in a laterally and longitudinally stable construction resistant to twisting and deformation. Planar extensions at each end of the primary lever are formed integral with the central portions of secondary levers at the ends of the primary lever. The longitudinal axes of the primary and secondary levers are disposed substantially perpendicular to each other. When the superstructure is removed from the mold, before it has cooled and while it is still in a pliant state, the secondary levers are rotated approximately ninety degrees partially overlapping in an operative angular relationship with respect to the primary span substantially parallel thereto. A pair of depending ears at each end of the primary span embrace a portion of the secondary spans to guide and align the spans. Catch means having co-operating elements on the depending ears on the secondary spans act to retain the secondary spans in an operative angular relationship with respect to the primary span. Thus the end extensions on the primary span function as flexible, resilient connectors and thereby assist in providing uniform distribution of the wiper loading. The depending ears also serve to maintain the longitudinal alignment of the primary and secondary spans and assist in resisting twisting. If a metal backing strip is used with a plastic superstructure of this type the backing strip further contributes to stabilizing the blade and to resisting of twisting.

The principal object of the present invention is to provide a simple and economical unitized molded superstructure for a wiper blade which is resistant to twisting.

Another object of the invention is to provide an integral molded plastic articulated superstructure for a wiper blade which is simple and economical to manufacture and which readily conforms to the contour of the windshield.

A further object of the invention is to provide an integral molded plastic articulated superstructure for a wiper blade which is simple and economical to manufacture, which is readily conformable to the contour of the windshield, and which is resilient and flexible at the joints and relatively rigid at the spans to assure uniform pressure distribution along the length of the blade.

A still further object of the invention is to provide a simple, economical method for manufacturing an articulated integral molded superstructure for a wiper blade which is flexible and resilient at the connections between the levers to achieve uniform pressure distribution and conformance with windshield curvature.

Other advantages and objects of the invention will be apparent from the following detailed description taken in connection with the accompanying drawings.

BRIEF DESCRIPTION OF THE DRAWINGS

FIG. 1 is a side elevational view of a wiper blade incorporating the invention;

FIG. 2 is a side elevational view of the superstructure employed in this invention prior to assembly;

FIG. 3 is a transverse sectional view of the superstructure of this invention taken on line III—III of FIG. 2;

FIG. 4 is a transverse sectional view taken on line IV—IV of FIG. 3;

FIG. 5 is a transverse sectional view taken on line V—V of FIG. 2;

FIG. 6 is a bottom elevational view of the superstructure shown in FIG. 2; and

FIG. 7 is a fragmentary perspective view illustrating the connection between the primary span and the secondary span.

DETAILED DESCRIPTION OF THE INVENTION

Referring now to FIG. 1 there is shown a wiper blade 10 having an articulated superstructure or pressure distributing frame 12 and a squeegee assembly 14. The superstructure 12 may be of molded thermoplastic composition or other suitable or desirable material. It includes a primary span 16 which partially overlaps a pair of secondary spans 18 connected intermediate their ends to each end of the primary span 16. The primary span may be of channel-shaped configuration in cross section including a web portion 20 and leg portions or side walls 22 with cross bracing 24 embossed on the internal surface of the web portion 20. Extending outwardly from each end of the channel-shaped primary span 16 is a planar connector 26 integrally secured to the secondary spans 18 intermediate their ends. Depending from the side surfaces or the legs 22 of the primary span 16 at each end thereof are a pair of ears 28 having formed on their internal opposed surfaces an inclined cam 30 protruding therefrom terminating in a shoulder 32 facing the internal surface of the web portion 20. The pairs of ears 28 embrace a portion of the secondary spans 18 adjacent the connector 26 and serve as aligning means to guide, align and prevent lateral displacement of the secondary spans 18 relative to the primary span 16.

The superstructure or pressure-distributing frame 12 is initially molded with the longitudinal axes of the secondary spans 18 disposed substantially perpendicular to the longitudinal axis of the primary span 16 as shown in FIG. 2. A recess 34 forming a shoulder or abutment 36 is provided on the secondary spans 18 and is disposed in a position to engage the shoulder 32 when the secondary spans are rotated approximately 90° to the position shown in FIG. 1. As the secondary spans 18 are moved to the operative position the abutment 36 rides along inclined cam 30, springing the ears 28 outwardly until the shoulder 32 engages the abutment 36 at which time the resilience of the ears 28 causes the secondary spans 18 to be retained in the operative angular position relative to the primary span 16 as seen in FIG. 1. The abutment 36, inclined cam 30 and shoulder 32 constitute a catch means for retaining the spans in operative position. The ears 28 serve as guide means to assure proper alignment of adjacent spans. The inclined cam 30 and shoulder 32 constitute one element of the catch while the abutment 36 on the secondary span 18 constitutes the other element of the catch.

The pressure-distributing frame is formed in a mold under heat and pressure in the attitude seen in FIG. 2. It is removed from the mold before it is fully cooled and while still in a pliant state, whereupon the secondary spans 18 are moved to the position shown in FIG. 1 substantially parallel to the primary span 16. By this means the planar connectors 26 take a set substantially in the shape shown in FIG. 1 but retain their resilience and flexibility.

A transverse opening 38 is provided centrally of the primary span for receiving a cantilever pin-type arm to blade connector, and a spring latch 40 is provided to retain the arm and blade in assembled condition. Although this type of arm to blade connection is shown and described it will of course be understood that any suitable or desirable arm to blade connector may be employed in accordance with the broader aspects of this invention.

The secondary spans 18 may also be of channel-shaped configuration with the portions thereof that are overlapped by the primary span 16 being of smaller outside dimension in width than the internal dimensions of the primary span 16, thus rendering the secondary spans nestable within the channel-shaped primary span 16.

The squeegee assembly includes an element 42 of rubber or other elastomeric material having a wiping lip 44 along one longitudinal edge and a back portion 46 extending along the other longitudinal edge, separated by a neck portion (not visible) forming longitudinal grooves along each side of the blade. A backing strip 48 is formed from a flat strip of flexible material such as stainless steel or other suitable material and includes a longitudinal substantially central slot dividing the backing strip into a pair of side rails having bridges 50 offset upwardly and embracing the back 46. The secondary spans are formed with pairs of opposed claws 52 at each end which receive the side rails of the backing strip 48 to retain the squeegee assembly 14 on the superstructure. The backing strip 48 supports the rubber element 42, assists in distributing the pressure to the wiping lip and also assists in stabilizing the pressure-distributing frame 12 for resistance against twisting. Although the backing strip 48 is shown and described as being of metal it will of course be understood in accordance with the broader aspects of the invention the backing strip may be of plastic or other suitable or desirable material.

A unique windshield wiper blade having a superstructure or pressure-distributing frame of one piece integrally molded thermoplastic material has been shown and described which provides a stable twist resistant wiper blade conformable to the contour of a motor vehicle windshield and which provides for readily flexible and resilient articulation as well as uniform pressure distribution. Although the superstructure has been described as being of thermoplastic composition it will of course be understood that in accordance with the broadest aspects of the invention other suitable or desirable moldable materials can be employed.

It should now be apparent that an improved and effective windshield wiper blade has been provided. A certain specific embodiment of the invention has been described for the purpose of illustration but it will be apparent that various modifications and other embodiments are possible within the scope of the invention. It is to be understood, therefore, that the invention is not limited to the specific arrangement shown but in its broadest aspects it includes all equivalent embodiments and modifications which come within the scope of the invention.

What is claimed is:

1. A windshield wiper blade superstructure comprising a unitized pressure distributing frame having a series of integrally connected spans; integral, resilient, flexible connecting means for securing one span to an adjacent span and enabling adjacent spans to rotate relative to each other and to assume a partially overlapping operative position with their longitudinal axes generally in alignment with each other and aligning means adjacent to said connecting means acting between adjacent spans for guiding and retaining said spans in said operative position.

2. A windshield wiper blade superstructure according to claim 1 wherein said pressure distributing frame is of plastic material.

3. A windshield wiper blade superstructure according to claim 1 including catch means acting between said adjacent spans for retaining said spans at an operative angular relationship.

4. A windshield wiper blade superstructure according to claim 1 wherein said series of spans includes a primary span and secondary spans at each end thereof and wherein said aligning means comprises a pair of ears depending from the side surfaces of said primary span adjacent each end thereof positioned to embrace a portion of each of said secondary spans whereby accurate positioning is obtained and lateral displacement and twisting of said secondary spans relative to said primary span is avoided.

5. A windshield wiper blade superstructure according to claim 4 wherein the internal opposed surfaces of said pairs of ears include a first catch element, a co-operating catch element disposed on the external side surfaces of said secondary spans engageable with said first catch element to retain said secondary spans in an operative angular relationship relative to said primary span.

6. A windshield wiper blade superstructure according to claim 5 wherein one of said catch elements comprises an inclined cam surface terminating in a shoulder and the other of said catch elements comprises an abutment disposed for engagement with said shoulder.

7. A windshield wiper blade superstructure according to claim 3 wherein said primary span is channel-shaped in lateral cross section and wherein said secondary spans are nestable within said primary span at the overlapping portions thereof.

8. A windshield wiper blade superstructure according to claim 7 wherein said primary span includes bracing within the channel between the side walls to provide lateral and longitudinal stability thereof.

9. In a windshield wiper blade construction; a unitized superstructure of thermoplastic composition including a primary span and secondary spans molded integrally at each end thereof in a relative position substantially displaced from the operative position, each of said secondary spans being connected intermediate its ends to an end of said primary span by a resilient connector section, and means acting between adjacent spans for operatively retaining said spans in an operative position whereby said secondary spans can be rotated to and retained in the operative position relative to said primary span.

* * * * *